United States Patent
Sun et al.

(10) Patent No.: US 12,260,542 B2
(45) Date of Patent: Mar. 25, 2025

(54) METHOD FOR DETECTING PRODUCT FOR DEFECTS, ELECTRONIC DEVICE, AND STORAGE MEDIUM

(71) Applicant: HON HAI PRECISION INDUSTRY CO., LTD., New Taipei (TW)

(72) Inventors: Guo-Chin Sun, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 453 days.

(21) Appl. No.: 17/897,550

(22) Filed: Aug. 29, 2022

(65) Prior Publication Data

US 2023/0419473 A1    Dec. 28, 2023

(30) Foreign Application Priority Data

Jun. 22, 2022 (CN) .......................... 202210716240.6

(51) Int. Cl.
| | |
|---|---|
| *G06T 7/00* | (2017.01) |
| *G06F 17/16* | (2006.01) |
| *G06T 7/70* | (2017.01) |
| *G06V 10/44* | (2022.01) |

(52) U.S. Cl.
CPC ............ *G06T 7/0008* (2013.01); *G06F 17/16* (2013.01); *G06T 7/70* (2017.01); *G06V 10/44* (2022.01); *G06T 2207/20081* (2013.01); *G06T 2207/30108* (2013.01)

(58) Field of Classification Search
CPC ...................... G06T 7/0008; G06T 7/70; G06T 2207/20081; G06T 2207/30108; G06T 2207/20084; G06T 7/0004; G06T 7/001; G06F 17/16; G06V 10/44; G06V 10/7715; G06V 10/774; G06V 10/7796; G06V 2201/06; G06V 10/764; G06V 10/82; Y02P 90/30; G06N 3/04; G06N 3/084
See application file for complete search history.

(56) References Cited

U.S. PATENT DOCUMENTS

| | | | |
|---|---|---|---|
| 10,964,011 B2 | 3/2021 | Cosatto et al. | |
| 2019/0130279 A1* | 5/2019 | Beggel | G06V 10/82 |
| 2019/0287230 A1* | 9/2019 | Lu | G06N 3/088 |

(Continued)

FOREIGN PATENT DOCUMENTS

TW          202040511       11/2020

*Primary Examiner* — Iriana Cruz
(74) *Attorney, Agent, or Firm* — ScienBiziP, P.C.

(57) ABSTRACT

A method for detecting a product for defects implemented in an electronic device includes detecting images of a product for defects by a first defect detection model in a preset period, and obtaining a detection result; when a ratio of the number of negative sample images is greater than a preset threshold, training an autoencoder model; obtaining historical positive sample images of the product, inputting the history positive sample images into the trained autoencoder model, and calculating a latent feature; inputting the latent feature of each history positive sample image into a decoding layer of the trained autoencoder model, and calculating newly added positive sample images; training the first defect detection model and obtain a second defect detection model; and inputting images of a product to be detected to the second defect detection model, and obtaining a detection result of the product.

20 Claims, 2 Drawing Sheets

(56) References Cited

U.S. PATENT DOCUMENTS

| | | | | |
|---|---|---|---|---|
| 2020/0111204 A1* | 4/2020 | Cosatto | ................ | G06T 7/0004 |
| 2021/0374928 A1* | 12/2021 | Hida | .................. | G06F 18/2148 |
| 2023/0022631 A1* | 1/2023 | Rothmund | ............ | G06N 3/094 |
| 2023/0066499 A1* | 3/2023 | Zhang | .................... | G10L 25/27 |

* cited by examiner

METHOD FOR DETECTING PRODUCT FOR DEFECTS, ELECTRONIC DEVICE, AND STORAGE MEDIUM

FIELD

The subject matter herein generally relates to image processing, and particularly to an electronic device, a method for detecting a product for defects, and a storage medium.

BACKGROUND

In industrial detection, in order to improve the quality of industrial products, industrial products are usually examined for defects before they are packaged. A defect detection model system is usually applied on a production line, however, marking the defects of products is a significant and intensive task. In addition, different environmental factors may be the reasons for different degrees of defects in the products produced on the production line. If the defect detection model cannot detect the defective products affected by environmental factors, the cost of the production line may be greatly increased, and the production capacity will be greatly reduced.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
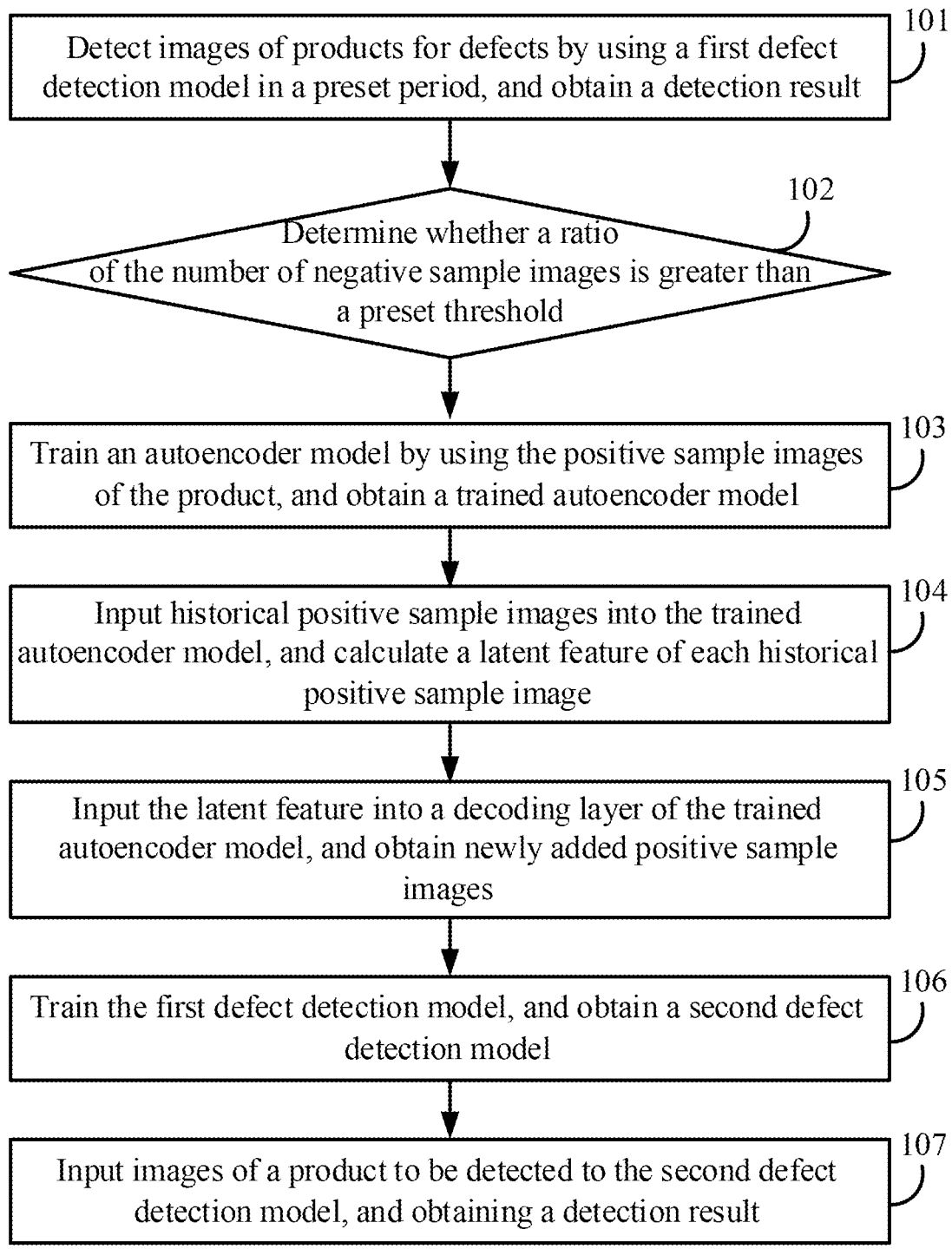
FIG. 1 illustrates a flowchart of an embodiment of a method for detecting a product for defects according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that the elements or articles so characterized may include other elements or articles. The terms "connect", "link" or the like are not limited to physical or mechanical connection, but may include electrical connections, whether direct or indirect.

An electronic device 2 (shown in FIG. 2) has a defect detection program installed, and may be a personal computer, a server, etc., the server may be a single server, a server cluster, or the like.

In one embodiment, the electronic device 2 can be in a wired network environment or in a wireless network environment. The wireless network can be radio, WI-FI, or cellular network. The cellular network can be a 4G network or a 5G network.

In one embodiment, the electronic device 2 may include at least one network device and/or at least one user device. The network device includes, but is not limited to, a single network server, a server group including a number of network servers, or cloud computer including a large number of hosts or web servers based on cloud computing.

FIG. 1 illustrates a flowchart of an embodiment of a method for detecting a product for defects. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, detecting images of products for defects by using a first defect detection model in a preset period, and obtaining a detection result.

In one embodiment, the preset period may be one hour. The preset period may be determined according to actual production conditions, which is not specifically limited.

In one embodiment, the first defect detection model includes, but is not limited to, an autoencoder and other models applied to improve the accuracy of defect detection, such as a Gaussian mixture model. When detecting the images of products, the first defect detection model may combine an autoencoder and a Gaussian mixture model, or the first defect detection model can include the autoencoder.

In one embodiment, the product may be a casing of a computer or a casing of a mobile phone case, etc., and the images may be captured by a camera device on a production line for detecting the product.

In one embodiment, the detection result includes positive sample images and negative sample images of the product. The positive sample images can be the images of non-defective product, and the negative sample images can be the images of products with defects.

For example, the positive sample images include, but is not limited to, the images of the casing of a computer and the casing of a mobile phone without any bumps, scratches, paint peelings, etc., and the negative sample images include, but are not limited to, the images of the casing of a computer and the casing of a mobile phone with the visible bumps, scratches, paint peeling, etc.

The production of the products is often influenced by different environmental factors, such as room temperature, humidity, level of lighting, etc. When the product is affected by environmental factors, a large number of features that are not learned by the first defect detection model may be generated. For example, under the influence of room temperature and lighting, the casing of the product may bulge, and under the influence of humidity, the product may be corroded. The positive sample images, the negative sample images, the environmental factors, and the defects caused by the influence of such environmental factors are not specifically limited.

At block 102, determining whether a ratio of the number of negative sample images in the detection result is greater than a preset threshold in the preset period.

In one embodiment, determining whether a ratio of the number of negative sample images in the detection result is greater than a preset threshold in the preset period includes: determining the negative sample images and positive sample images of the products within the preset period by using the first defect detection model, and determining whether the ratio of the number of negative sample images in the detection result is greater than the preset threshold value, that is, determining whether the ratio of the number of negative sample images to a sum of the number of negative sample images and the number of positive sample images is greater than the preset threshold value.

For example, in the preset period, the preset threshold is 10%, the number of detected negative sample images is 10, the number of detected positive sample images is 150, and the sum of the number of negative sample images and the number of positive sample images is 10+150=160. The ratio of the number of negative sample images to the sum of the number of negative sample images and the number of positive sample images is calculated as 10/160=0.0625, or 6.25%. The ratio of the number of negative sample images to the sum of the number of negative sample images and the number of product positive sample images is 6.25%, which is less than the preset threshold of 10%. If the number of detected negative sample images is 60, the number of detected positive sample images is 100, and the ratio of the number of negative sample images to the sum of the number of negative sample images and the number of positive sample images is 60/160=0.375, that is, 37.5%, which is greater than the preset threshold of 10%.

If the ratio of the number of negative sample images to the sum of the number of negative sample images and the number of positive sample images is less than the preset threshold, the process returns to block 101. If the ratio of the number of negative sample images to the sum of the number of negative sample images and the number of positive sample images is greater than or equal to the preset threshold, the process goes to block 103.

At block 103, training an autoencoder model by using the positive sample images of the product in the detection result and obtaining a trained autoencoder model.

In one embodiment, if the ratio of the number of negative sample images to the sum of the number of negative sample images and the number of positive sample images in the detection result is greater than or equal to the preset threshold, the number of product negative sample images is then eliminated, and the number of positive sample images of the products is obtained and input into the autoencoder model, thereby training the autoencoder model, and the trained autoencoder model is thus obtained.

It should be noted that the autoencoder model can be a neural network that uses a back-propagation algorithm to make the output value equal to the input value. The autoencoder model includes an encoder and a decoder. The encoder can compress the input data into a latent space representation, and the decoder can reconstruct the latent space representation into the output data.

In one embodiment, the encoder in the autoencoder model includes a number of hidden layers, the encoding layer is at least one of the number of hidden layers, and the number of the hidden layers can be preset according to actual requirements or the application scenario.

In one embodiment, the method for training the autoencoder model includes: vectorizing the positive sample images of the product, and obtaining a feature vector of the positive sample images of the product; performing an operation on the feature vector by using the encoding layer of the autoencoder model, and obtaining the latent feature of the positive sample images of the product, the operation includes matrix transformation or linear transformation; performing the operation on the latent feature by using the decoding layer of the autoencoder model, and restoring the latent feature obtained after the operation; optimizing the autoencoder model and obtaining the trained autoencoder model.

In one embodiment, optimizing the autoencoder model and obtaining the trained autoencoder model includes: setting a loss function, minimizing the loss function by training the autoencoder model and thus obtaining the trained autoencoder model. In one embodiment, the loss function may be a cross entropy function or a mean square error function.

At block 104, obtaining historical positive sample images of the product, inputting the historical positive sample images into the trained autoencoder model, and calculating the latent feature of each historical positive sample image by the encoding layer of the trained autoencoder model.

In one embodiment, the historical positive sample images may be positive sample images obtained before the preset period, or may be positive sample images detected one or more month ago.

In one embodiment, inputting the historical positive sample images into the trained autoencoder model, and calculating the latent feature of each historical positive sample image by the encoding layer of the trained autoencoder model includes: vectorizing each historical positive sample image of the product, and obtaining a feature vector of the historical positive sample image of the product; extracting the hidden layer corresponding to the encoding layer; performing the operation on the feature vector by using the hidden layer, and obtaining the latent feature of each historical positive sample image of the product.

In one embodiment, performing the operation on the feature vector by using the hidden layer, and obtaining the latent feature of each historical positive sample image of the product includes: obtaining the weight matrix and offset value of the hidden layer; multiplying the feature vector of the historical positive sample image of the product and the weight matrix, and obtaining an operation result; obtaining the latent feature of the historical positive sample image by adding the operation result and the offset value.

At block 105, inputting the latent features of the historical positive sample images of the product into the decoding layer of the trained autoencoder model, and obtaining newly added positive sample images.

In one embodiment, inputting the latent features of the historical positive sample images of the product into the decoding layer of the trained autoencoder model, and obtaining newly added positive sample images includes: performing the operation on the latent features of the historical positive sample images of the product by using the decoding layer of the autoencoder model, and restoring the vector obtained after the operation, and obtaining the newly added positive sample images.

In one embodiment, the decoding layer in the autoencoder model may map low-dimensional data into high-dimensional data, thereby increasing the amount of data, and restoring the original appearance of the compressed data, that is, the vector obtained by performing the operation on the latent feature of the historical positive sample image can thus be restored.

At block 106, training the first defect detection model according to the newly added positive sample images, the historical positive sample images of the product, and the positive sample images of the product, and obtaining a second defect detection model.

In one embodiment, in the preset period, if the first defect detection model detects that the ratio of the number of negative sample images to the sum of the number of negative sample images and the number of positive sample images is greater than the preset threshold, the first defect detection model is automatically trained according to the newly added positive sample images, the historical positive sample images of the product, and the positive sample images of the product, so as to obtain the second defect detection model.

When the number of detected negative sample images reaches a certain number within the preset period, the first defect detection model originally used for defect detection is automatically trained and updated, and the updated second defect detection model can learn more representative features of the positive sample images, errors of the defect detection model can be reduced, production costs can be reduced, and production capacity can be increased.

At block 107, inputting images of a product to be detected to the second defect detection model, and obtaining a detection result of the product to be detected.

In one embodiment, inputting images of a product to be detected to the second defect detection model, and obtaining a detection result of the product to be detected includes: when the images of the product to be detected are inputted to the second defect detection model, outputting a reconstructed image corresponding to each image to be detected, and determining whether the product is defective according to a difference between the reconstructed image and each image to be detected, if the difference between the reconstructed image and each image to be detected is less than a preset value, determining that the product is not defective, if the difference between the reconstructed image and each image to be detected is greater than or equal to the preset value, determining that the product is defective.

Figure 2:
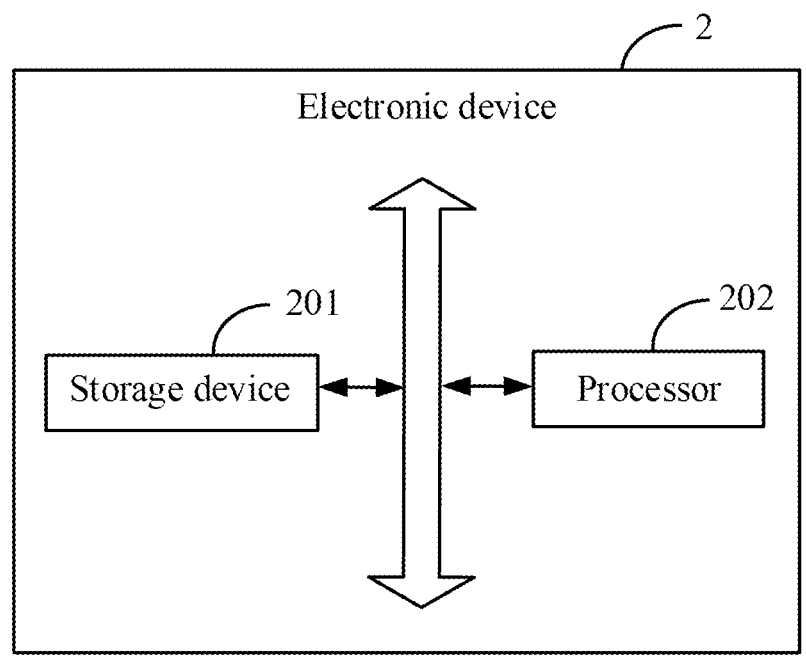
FIG. 2 is a block diagram of an embodiment of an electronic device according to the present disclosure.

FIG. 2 illustrates the electronic device 2. The electronic device 2 includes, but is not limited to, a storage device 201, a processor 202, and a computer program. FIG. 6 illustrates only one example of the electronic device 2. Other examples can include more or fewer components than as illustrated or have a different configuration of the various components in other embodiments.

The processor 202 can be a central processing unit (CPU), a microprocessor, or other data processor chip that performs functions in the electronic device 2.

In one embodiment, the storage device 201 can include various types of non-transitory computer-readable storage mediums. For example, the storage device 201 can be an internal storage system, such as a flash memory, a random access memory (RAM) for the temporary storage of information, and/or a read-only memory (ROM) for permanent storage of information. The storage device 201 can also be an external storage system, such as a hard disk, a storage card, or a data storage medium.

The storage device 201 stores instructions, the processor 202 executes the computer program stored in the storage device 201 for implementing the method for detecting a product for defects provided in the embodiments of the present disclosure. The computer program can be a defect detection program and include instructions.

Upon execution of the instructions stored in the storage device 201, the processor 202 is configured to:
- detect images of products for defects by using a first defect detection model in a preset period, and obtain a detection result;
- determine whether a ratio of the number of negative sample images in the detection result is greater than a preset threshold in the preset period;
- train an autoencoder model by using the positive sample images of the product in the detection result, and obtain a trained autoencoder model;
- obtain historical positive sample images of the product, input the historical positive sample images into the trained autoencoder model, and calculate the latent feature of the historical positive sample images by the encoding layer of the trained autoencoder model;
- input the latent feature of the historical positive sample images of the product into the decoding layer of the trained autoencoder model, and calculate newly added positive sample images;
- train the first defect detection model according to the newly added positive sample images, the historical positive sample images of the product, and the positive sample images of the product, and obtaining a second defect detection model.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
detect images of a product for defects by using a first defect detection model in a preset period, and obtain a detection result, the detection result comprising a plurality of negative sample images and positive sample images of the product;
determine whether a ratio of the number of negative sample images in the detection result is greater than a preset threshold;
in response that the ratio of the number of negative sample images in the detection result is greater than the preset threshold, train an autoencoder model by using the positive sample images of the product in the detection result, and obtain a trained autoencoder model;

obtain historical positive sample images of the product, input the historical positive sample images into the trained autoencoder model, and calculate a latent feature of each historical positive sample image by an encoding layer of the trained autoencoder model;

input the latent feature of each historical positive sample image of the product into a decoding layer of the trained autoencoder model, and obtain newly added positive sample images;

train the first defect detection model according to the newly added positive sample images, the historical positive sample images of the product, and the positive sample images of the product, and obtain a second defect detection model; and input images of a product to be detected to the second defect detection model, and obtain a detection result of the product to be detected.

2. The electronic device according to claim 1, wherein the at least one processor is further caused to:

vectorize the positive sample images of the product, and obtain a feature vector of the positive sample images of the product;

perform an operation on the feature vector by using the encoding layer of the autoencoder model, and obtain the latent feature of each positive sample image of the product, the operation comprising matrix transformation or linear transformation;

perform the operation on the latent feature by using a decoding layer of the autoencoder model, and restore the latent feature obtained after the operation; and optimize the autoencoder model and obtain the trained autoencoder model.

3. The electronic device according to claim 2, wherein the at least one processor is further caused to:

set a loss function; and minimize the loss function by training the autoencoder model, and obtain the trained autoencoder model.

4. The electronic device according to claim 1, wherein the at least one processor is further caused to:

vectorize each historical positive sample image of the product, and obtain a feature vector of each historical positive sample image of the product;

extract a hidden layer corresponding to the encoding layer; and perform the operation on the feature vector by using the hidden layer, and obtain the latent feature of each historical positive sample image of the product.

5. The electronic device according to claim 4, wherein the at least one processor is further caused to:

obtain a weight matrix and an offset value of the hidden layer;

multiply the feature vector of the historical positive sample image of the product and the weight matrix, and obtaining an operation result; and obtain the latent feature of each historical positive sample image by adding the operation result and the offset value.

6. The electronic device according to claim 1, wherein the at least one processor is further caused to:

perform the operation on the latent feature of each historical positive sample image of the product by using a decoding layer of the autoencoder model; and restore a vector obtained after the operation, and obtain the newly added positive sample images.

7. The electronic device according to claim 1, wherein the at least one processor is further caused to:

in response that the ratio of the number of negative sample images to the sum of the number of negative sample images and the number of positive sample images in the detection result is greater than the preset threshold, eliminate the negative sample images; and obtain the positive sample images of the product.

8. A method for detecting a product for defects implemented in an electronic device comprising:

detecting images of a product for defects by using a first defect detection model in a preset period, and obtaining a detection result, the detection result comprising a plurality of negative sample images and positive sample images of the product;

determining whether a ratio of the number of negative sample images in the detection result is greater than a preset threshold;

in response that the ratio of the number of negative sample images in the detection result is greater than a preset threshold, training an autoencoder model by using the positive sample images of the product in the detection result, and obtaining a trained autoencoder model;

obtaining historical positive sample images of the product, inputting the historical positive sample images into the trained autoencoder model, and calculating a latent feature of each historical positive sample image by the encoding layer of the trained autoencoder model;

inputting the latent feature of each historical positive sample image of the product into the decoding layer of the trained autoencoder model, and obtaining newly added positive sample images;

training the first defect detection model according to the newly added positive sample images, the historical positive sample images of the product, and the positive sample images of the product, and obtain a second defect detection model; and inputting images of a product to be detected to the second defect detection model, and obtaining a detection result of the product to be detected.

9. The method according to claim 8, wherein training an autoencoder model by using the positive sample images of the product in the detection result, and obtaining a trained autoencoder model comprises:

vectorizing the positive sample images of the product, and obtaining a feature vector of the positive sample images of the product;

performing an operation on the feature vector by using the encoding layer of the autoencoder model, and obtaining the latent feature of each positive sample image of the product, the operation comprising matrix transformation or linear transformation;

performing the operation on the latent feature by using the decoding layer of the autoencoder model, and restoring the latent feature obtained after the operation; and optimizing the autoencoder model and obtaining the trained autoencoder model.

10. The method according to claim 9, wherein optimizing the autoencoder model and obtaining a trained autoencoder model comprises:

setting a loss function; and minimizing the loss function by training the autoencoder model, and obtaining the trained autoencoder model.

11. The method according to claim 8, wherein calculating a latent feature of each historical positive sample image by the encoding layer of the trained autoencoder model comprises:

vectorizing each historical positive sample image of the product, and obtaining a feature vector of each historical positive sample image of the product;

extracting a hidden layer corresponding to the encoding layer; and performing the operation on the feature vector by using the hidden layer, and obtaining the latent feature of each historical positive sample image of the product.

12. The method according to claim 11, wherein performing the operation on the feature vector by using the hidden layer, and obtaining the latent feature of each historical positive sample image of the product comprises:

obtaining a weight matrix and an offset value of the hidden layer;

multiplying the feature vector of the historical positive sample image of the product and the weight matrix, and obtaining an operation result; and obtaining the latent feature of each historical positive sample image by adding the operation result and the offset value.

13. The method according to claim 8, wherein inputting the latent feature of each historical positive sample image of the product into the decoding layer of the trained autoencoder model, and obtaining newly added positive sample images comprise:

performing the operation on the latent feature of each historical positive sample image of the product by using a decoding layer of the autoencoder model; and restoring a vector obtained after the operation, and obtaining the newly added positive sample images.

14. The method according to claim 8, further comprising:

in response that the ratio of the number of negative sample images to the sum of the number of negative sample images and the number of positive sample images in the detection result is greater than the preset threshold, eliminating the negative sample images; and obtaining the positive sample images of the product.

15. A computer-readable storage medium having instructions stored thereon, when the instructions are executed by a processor of an electronic device, the processor is configured to perform a method for detecting a product for defects, wherein the method comprises:

detecting images of a product for defects by using a first defect detection model in a preset period, and obtaining a detection result, the detection result comprising a plurality of negative sample images and positive sample images of the product;

determining whether a ratio of the number of negative sample images in the detection result is greater than a preset threshold;

in response that the ratio of the number of negative sample images in the detection result is greater than a preset threshold, training an autoencoder model by using the positive sample images of the product in the detection result, and obtaining a trained autoencoder model;

obtaining historical positive sample images of the product, inputting the historical positive sample images into the trained autoencoder model, and calculating a latent feature of each historical positive sample image by the encoding layer of the trained autoencoder model;

inputting the latent feature of each historical positive sample image of the product into the decoding layer of the trained autoencoder model, and obtaining newly added positive sample images;

training the first defect detection model according to the newly added positive sample images, the historical positive sample images of the product, and the positive sample images of the product, and obtain a second defect detection model; and inputting images of a product to be detected to the second defect detection model, and obtaining a detection result of the product to be detected.

16. The storage medium according to claim 15, wherein training an autoencoder model by using the positive sample images of the product in the detection result, and obtaining a trained autoencoder model comprises:

vectorizing the positive sample images of the product, and obtaining a feature vector of the positive sample images of the product;

performing an operation on the feature vector by using the encoding layer of the autoencoder model, and obtaining the latent feature of each positive sample image of the product, the operation comprising matrix transformation or linear transformation;

performing the operation on the latent feature by using the decoding layer of the autoencoder model, and restoring the latent feature obtained after the operation; and optimizing the autoencoder model and obtaining the trained autoencoder model.

17. The storage medium according to claim 16, wherein optimizing the autoencoder model and obtaining a trained autoencoder model comprises:

setting a loss function; and minimizing the loss function by training the autoencoder model, and obtaining the trained autoencoder model.

18. The storage medium according to claim 15, wherein calculating a latent feature of each historical positive sample image by the encoding layer of the trained autoencoder model comprises:

vectorizing each historical positive sample image of the product, and obtaining a feature vector of each historical positive sample image of the product;

extracting a hidden layer corresponding to the encoding layer; and performing the operation on the feature vector by using the hidden layer, and obtaining the latent feature of each historical positive sample image of the product.

19. The storage medium according to claim 18, wherein performing the operation on the feature vector by using the hidden layer, and obtaining the latent feature of each historical positive sample image of the product comprises:

obtaining a weight matrix and an offset value of the hidden layer;

multiplying the feature vector of the historical positive sample image of the product and the weight matrix, and obtaining an operation result; and obtaining the latent feature of each historical positive sample image by adding the operation result and the offset value.

20. The storage medium according to claim 15, wherein inputting the latent feature of each historical positive sample image of the product into the decoding layer of the trained autoencoder model, and obtaining newly added positive sample images comprise:

performing the operation on the latent feature of each historical positive sample image of the product by using a decoding layer of the autoencoder model; and restoring a vector obtained after the operation, and obtaining the newly added positive sample images.

* * * * *